(12) United States Patent
Xu et al.

(10) Patent No.: US 8,046,534 B2
(45) Date of Patent: Oct. 25, 2011

(54) MANAGING SNAPSHOTS IN STORAGE SYSTEMS

(75) Inventors: Xia Xu, Boise, ID (US); Aaron Lindemann, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1397 days.

(21) Appl. No.: 11/586,930

(22) Filed: Oct. 26, 2006

(65) Prior Publication Data

US 2008/0104139 A1    May 1, 2008

(51) Int. Cl.
*G06F 13/00* (2006.01)
(52) U.S. Cl. .......................... 711/114; 707/639
(58) Field of Classification Search ................... 711/114
See application file for complete search history.

(56) References Cited

U.S. PATENT DOCUMENTS

| | | | | |
|---|---|---|---|---|
| 7,100,089 | B1 * | 8/2006 | Phelps | 714/42 |
| 7,404,051 | B2 * | 7/2008 | Shitomi | 711/162 |
| 7,788,244 | B2 * | 8/2010 | Xu et al. | 707/704 |

OTHER PUBLICATIONS

U.S. Appl. No. 11/404,240, Aaron Lindemann.

* cited by examiner

*Primary Examiner* — Hetul Patel (57) ABSTRACT

Embodiments include methods, apparatus, and systems for managing snapshots in storage systems. One method includes logically linking a plurality of snapshots to a logical disk in a storage network; and splitting the snapshots from the logical disk to form a snapshot tree that includes the snapshots split from the logical disk.

20 Claims, 7 Drawing Sheets

MANAGING SNAPSHOTS IN STORAGE SYSTEMS

BACKGROUND

The ability to duplicate and store the contents of a storage device is an important feature in many storage systems. In some storage systems, data is stored in parallel to safeguard against the failure of a single storage device or medium. Upon a failure of a first storage device or medium, the system retrieves a copy of the data contained in a second storage device or medium. The ability to duplicate and store the contents of the storage device also facilitates the creation of a fixed record of contents at the time of duplication. This feature allows users to recover a prior version of inadvertently edited or erased data.

In storage systems, space and processing costs are associated with copying and storing the contents of a storage device. For example, some storage devices cannot accept input/output (I/O) operations while its contents are being copied. Furthermore, the storage space used to keep the copy cannot be used for other storage needs.

In an effort to become more efficient and mitigate costs, storage systems and storage software products provide ways to make point-in-time copies of disk volumes, sometimes referred to as snapshots. In some storage systems, copies are quickly made without significantly disturbing applications using disk volumes. Further, copies can be made to share storage instead of copying all the disk volume data.

Storage systems that create snapshots, however, have limitations. Only a limited number of snapshots can be created under a single Logical Disk. Further, all snapshots created under the Logical Disk need to have a same RAID type. Further, current storage systems restrict users in creating snapclones or mirror clones if a snapshot already exists. If a user wants to make a mirror clone for a Logical Disk with existing snapshots, all existing snapshots have to be deleted before such operation.

DETAILED DESCRIPTION

Embodiments in accordance with the present invention are directed to managing snapshots in storage systems. One exemplary embodiment allows users to create unlimited number of snapshots under a Logical Disk. Existing snapshots associated with a Logical Disk are split or separated from the Logical Disk. The split snapshots are retained or stored as a standalone tree, which will not be affected if an overcommit occurs in the original Logical Disk or storage tree.

Exemplary embodiments split one or more existing snapshots from the original Logical Disk and move these split snapshots to an independent and separate standalone tree. These split snapshots can be all of the snapshots of the Logical Disk or any user defined number. For instance, one or more of the oldest snapshots are split from the Logical Disk to create an independent snapshot tree. Exemplary embodiments create mirror clones or snapclones for a Logical Disk that already has snapshots.

In some storage area network systems, a source virtual disk (Vdisk) cannot be expanded or shrunk in size if it has snapshots. Exemplary embodiments enable splitting off all snapshots to a standalone snaptree which, in turn, allows the source Vdisk to be expanded or shrunk.

Exemplary embodiments do not have a limit on a number of snapshots that can be created under a single Logical Disk. When a maximum number of snapshots is reached, users are not required to delete snapshots from the Logical Disk to create room for a newer snapshot. Instead, exemplary embodiments enable a user to selectively save old or existing snapshots. By separating snapshots from the Logical Disk and splitting them to a standalone tree, existing or old snapshots are not required to be deleted.

Further, exemplary embodiments are not limited to creating snapshots that all have a same redundant array of independent disks (RAID) type. If a user creates first RAID level snapshots and later decides to increase or change to second RAID level protection, the user can create a different RAID level under the same tree without deleting all the prior snapshots. For example, if a user creates RAID level 0 snapshots under a Logical Disk, these snapshots can be split from the Logical Disk. Then, under the same tree, the user can change the RAID designation (example, to RAID level 5) for subsequent snapshots to the same Logical Disk. The RAID level 0 snapshots are not required to be deleted.

Thus, exemplary embodiments enable a user to increase RAID protection of snapshots after the tree is split. For example, if the Source Vdisk is RAID 1 and the snapshots are RAID 6 while the snapshots are in the same tree as the Source Vdisk, the snapshots really only have RAID 1 protection because they share data with the Source Vdisk. A loss of two RAID 1 drives will cause the Source Vdisk and all snapshots to be inaccessible. After the tree is split, the Source Vdisk is still RAID 1. The Snapshots are still RAID 6, but are now an independent tree. Thus a loss of two RAID 1 drives will cause the Source Vdisk to be inaccessible but all the snapshots in the new tree will still be accessible (possibly for recovery of the Source Vdisk). Having snapshots of a higher raid protection and increased storage efficiency, like RAID 6, have benefit for on-line archiving and recovery situations, for example.

In accordance with at least some exemplary embodiments, the subject matter is implemented in a storage architecture that provides virtualized data storage at a system level, such that virtualization is implemented within one or more storage area networks (SANs). In the implementations described herein, the computing systems that utilize storage are referred to as hosts. In a typical implementation, a host is any computing system that consumes data storage resources capacity on its own behalf, or on behalf of systems coupled to the host. For example, a host is a computer processing large databases, a transaction processing server maintaining transaction records, and the like. Alternatively, the host is a file server on a local area network (LAN) or wide area network (WAN) that provides storage services for an enterprise.

In a direct-attached storage solution, such a host includes one or more disk controllers or RAID controllers configured to manage multiple directly attached disk drives. By contrast, in a SAN, a host connects to the SAN through one or more high-speed connection technology, such as a fibre channel (FC) fabric.

A virtualized SAN architecture comprises a group of storage cells, where each storage cell includes a pool of storage devices called a disk group. Each storage cell comprises parallel storage controllers coupled to the disk group. The storage controllers couple to the storage devices through a fibre channel arbitrated loop connection or through a network, such as a fibre channel fabric or the like. In one exemplary embodiment, the storage controllers are also coupled to each other through point-to-point connections to enable them to cooperatively manage the presentation of storage capacity to computers using the storage capacity.

The network architectures described herein represent a distributed computing environment, such as an enterprise computing system using a private SAN. However, the network architectures are readily scaled upwardly or downwardly to meet the needs of a particular application.

Figure 1:
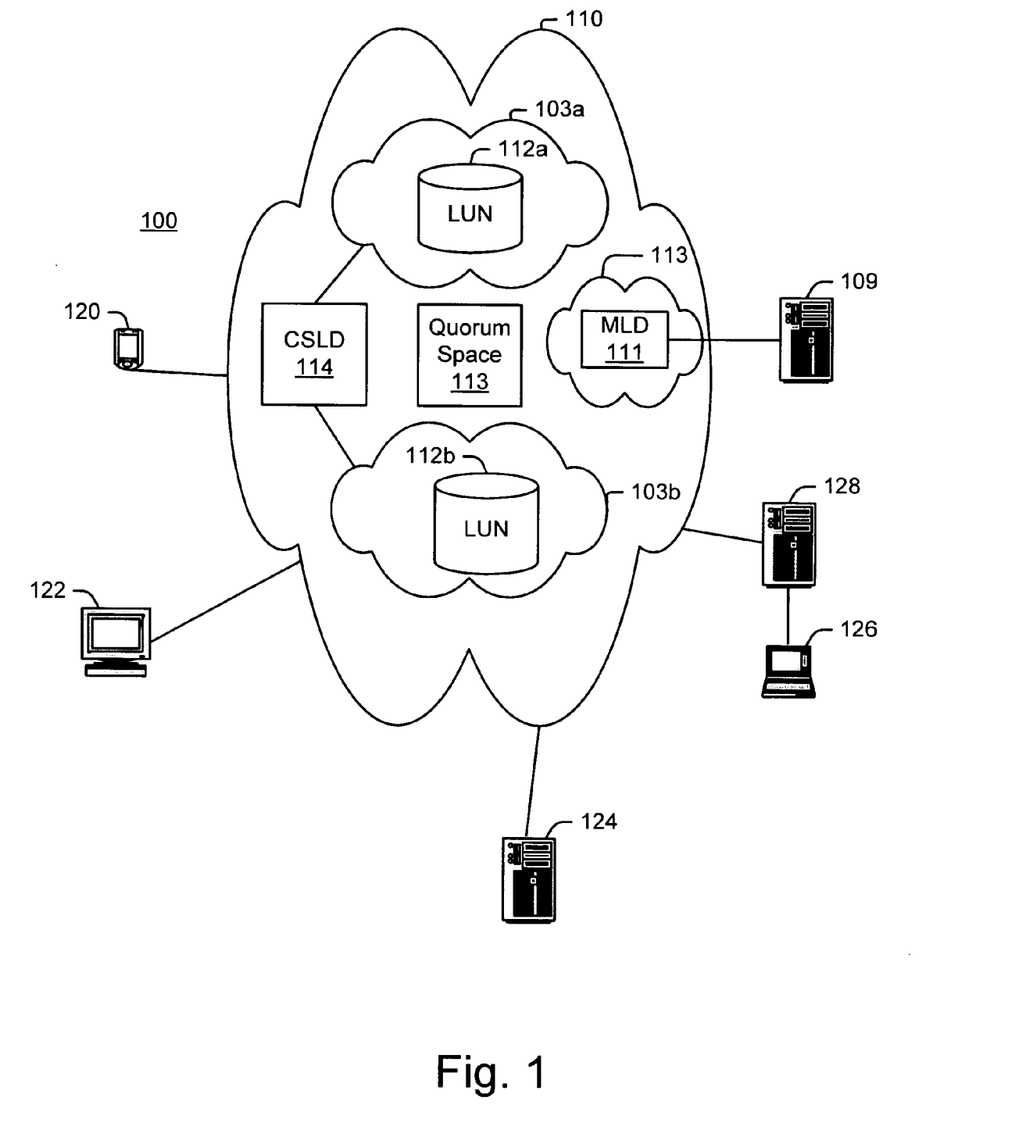
FIG. 1 is a schematic illustration of an exemplary implementation of a networked computing system that utilizes a storage network in accordance with an exemplary embodiment of the present invention.

FIG. 1 is a schematic illustration of an exemplary implementation of a networked computing system 100 that utilizes a storage network in accordance with an exemplary embodiment of the present invention. In one exemplary implementation, the storage pool 110 is implemented as a virtualized storage pool.

A plurality of logical disks (also called logical units or LUNs) 112a, 112b are allocated within storage pool 110. Each LUN 112a, 112b comprises a contiguous range of logical addresses that are addressed by host devices 120, 122, 124 and 128 by mapping requests from the connection protocol used by the host device to the uniquely identified LUN 112a, 112b. A host, such as server 128, provides services to other computing or data processing systems or devices. For example, client computer 126 accesses storage pool 110 via a host, such as server 128. Server 128 provides file services to client 126 and provides other services such as transaction processing services, email services, etc. Hence, client device 126 may or may not directly use the storage consumed by host 128.

Devices such as wireless device 120, and computers 122, 124, which also may serve as hosts, logically couple directly to LUNs 112a, 112b. Hosts 120-128 can couple to multiple LUNs 112a, 112b, and LUNs 112a, 112b and include memory, mass storage, and a degree of data processing capability sufficient to manage a network connection.

A LUN, such as LUN 112a, 112b, comprises one or more redundant stores (RStore) that are a fundamental unit of reliable storage. An RStore comprises an ordered set of physical storage segments (PSEGs) with associated redundancy properties and is contained entirely within a single redundant store set (RSS). By analogy to conventional storage systems, PSEGs are analogous to disk drives and each RSS is analogous to a RAID storage set comprising a plurality of drives.

The PSEGs that implement a particular LUN are spread across any number of physical storage disks. Moreover, the physical storage capacity that a particular LUN 112a, 112b represents is configured to implement a variety of storage types offering varying capacity, reliability and availability features. For example, some LUNs represent striped, mirrored, and/or parity-protected storage. Other LUNs represent storage capacity that is configured without striping, redundancy, or parity protection.

In an exemplary implementation, an RSS comprises a subset of physical disks in a Logical Device Allocation Domain (LDAD) and includes from six to eleven physical drives (which can change dynamically). The physical drives can have disparate capacities. Further, physical drives within an RSS are assigned indices (e.g., 0, 1, 2, . . . , 11) for mapping purposes and are organized as pairs (i.e., adjacent odd and even indices) for RAID-1 purposes. Because data protection is spread within an RSS in accordance with one exemplary embodiment, and not across multiple RSSs, a disk failure in one RSS has no effect on the availability of any other RSS.

A SAN manager appliance 109 is coupled to a management logical disk set (MLD) 111 which is a metadata container describing the logical structures used to create LUNs 112a, 112b, LDADs 103a, 103b, and other logical structures used by the system. A portion of the physical storage capacity available in storage pool 101 is reserved as quorum space 113 and cannot be allocated to LDADs 103a, 103b, and hence cannot be used to implement LUNs 112a, 112b. In a particular example, each physical disk that participates in storage pool 110 has a reserved amount of capacity (e.g., the first "n" physical sectors) that may be designated as quorum space 113. MLD 111 is mirrored in this quorum space of multiple physical drives and so can be accessed even if a drive fails. In a particular example, at least one physical drive is associated with each LDAD 103a, 103b includes a copy of MLD 111 (designated a "quorum drive"). SAN management appliance 109 can associate information such as name strings for LDADs 103a, 103b and LUNs 112a, 112b, and timestamps for objects. To facilitate this behavior, the management agent uses MLD 111 to store this information as metadata. MLD 111 is created implicitly upon creation of each LDAD 103a, 103b.

Quorum space 113 is used to store information including physical store ID (a unique ID for each physical drive), version control information, type (quorum/non-quorum), RSS ID (identifies to which RSS this disk belongs), RSS Offset (identifies this disk's relative position in the RSS), Storage Cell ID (identifies to which storage cell this disk belongs), PSEG size, as well as state information indicating whether the disk is a quorum disk, for example. This metadata PSEG also contains a PSEG free list for the entire physical store, probably in the form of an allocation bitmap. Additionally, quorum space 113 contains the PSEG allocation records (PSARs) for every PSEG on the physical disk. The PSAR comprises a PSAR signature, Metadata version, PSAR usage, and an indication a RSD to which this PSEG belongs.

CSLD 114 is another type of metadata container comprising logical drives that are allocated out of address space within each LDAD 103a, 103b, but that, unlike LUNs 112a, 112b, can span multiple LDADs 103a, 103b. Preferably, each LDAD 103a, 103b includes space allocated to CSLD 114. CSLD 114 holds metadata describing the logical structure of a given LDAD 103a, 103b, including a primary logical disk metadata container (PLDMC) that contains an array of descriptors (called RSDMs) that describe every RStore used by each LUN 112a, 112b implemented within the LDAD 103a, 103b. The CSLD 114 implements metadata that is regularly used for tasks such as disk creation, leveling, RSS merging, RSS splitting, and regeneration. This metadata includes state information for each physical disk that indicates whether the physical disk is "Normal" (i.e., operating as expected), "Missing" (i.e., unavailable), "Merging" (i.e., a missing drive that has reappeared and must be normalized before use), "Replace" (i.e., the drive is marked for removal and data must be copied to a distributed spare), and "Regen" (i.e., the drive is unavailable and requires regeneration of its data to a distributed spare).

A logical disk directory (LDDIR) data structure is a directory of all LUNs 1112a, 112b in any LDAD 103a, 103b. An entry in the LDDS comprises a universally unique ID (UUID) an RSD indicating the location of a Primary Logical Disk Metadata Container (PLDMC) for that LUN 112a, 112b. The RSD is a pointer to the base RSDM or entry point for the corresponding LUN 112a, 112b. In this manner, metadata specific to a particular LUN 112a, 112b can be accessed by indexing into the LDDIR to find the base RSDM of the particular LUN 112a, 112b. The metadata within the PLDMC (e.g., mapping structures described hereinbelow) can be loaded into memory to realize the particular LUN 112a, 112b.

Hence, the storage pool depicted in FIG. 1 implements multiple forms of metadata that can be used for recovery. The CSLD 114 implements metadata that is regularly used for tasks such as disk creation, leveling, RSS merging, RSS splitting, and regeneration. The PSAR metadata held in a known location on each disk contains metadata in a more rudimentary form that is not mapped into memory, but can be accessed when needed from its known location to regenerate all metadata in the system.

Each of the devices shown in FIG. 1 can include memory, mass storage, and a degree of data processing capability sufficient to manage a network connection. The computer program devices in accordance with the present invention are implemented in the memory of the various devices shown in FIG. 1 and enabled by the data processing capability of the devices shown in FIG. 1.

In an exemplary implementation an individual LDAD 103a, 103b corresponds to from as few as four disk drives to as many as several thousand disk drives. In particular examples, a minimum of eight drives per LDAD is required to support RAID-1 within the LDAD 103a, 103b using four paired disks. LUNs 112a, 112b defined within an LDAD 103a, 103b represent a few megabytes of storage or less, up to 2 TByte of storage or more. Hence, hundreds or thousands of LUNs 112a, 112b can be defined within a given LDAD 103a, 103b, and thus serve a large number of storage needs. In this manner, a large enterprise can be served by a single storage pool 110 providing both individual storage dedicated to each workstation in the enterprise as well as shared storage across the enterprise. Further, an enterprise can implement multiple LDADs 103a, 103b and/or multiple storage pools 1101 to provide a virtually limitless storage capability. Logically, therefore, the virtual storage system in accordance with the present description offers great flexibility in configuration and access.

Figure 2:
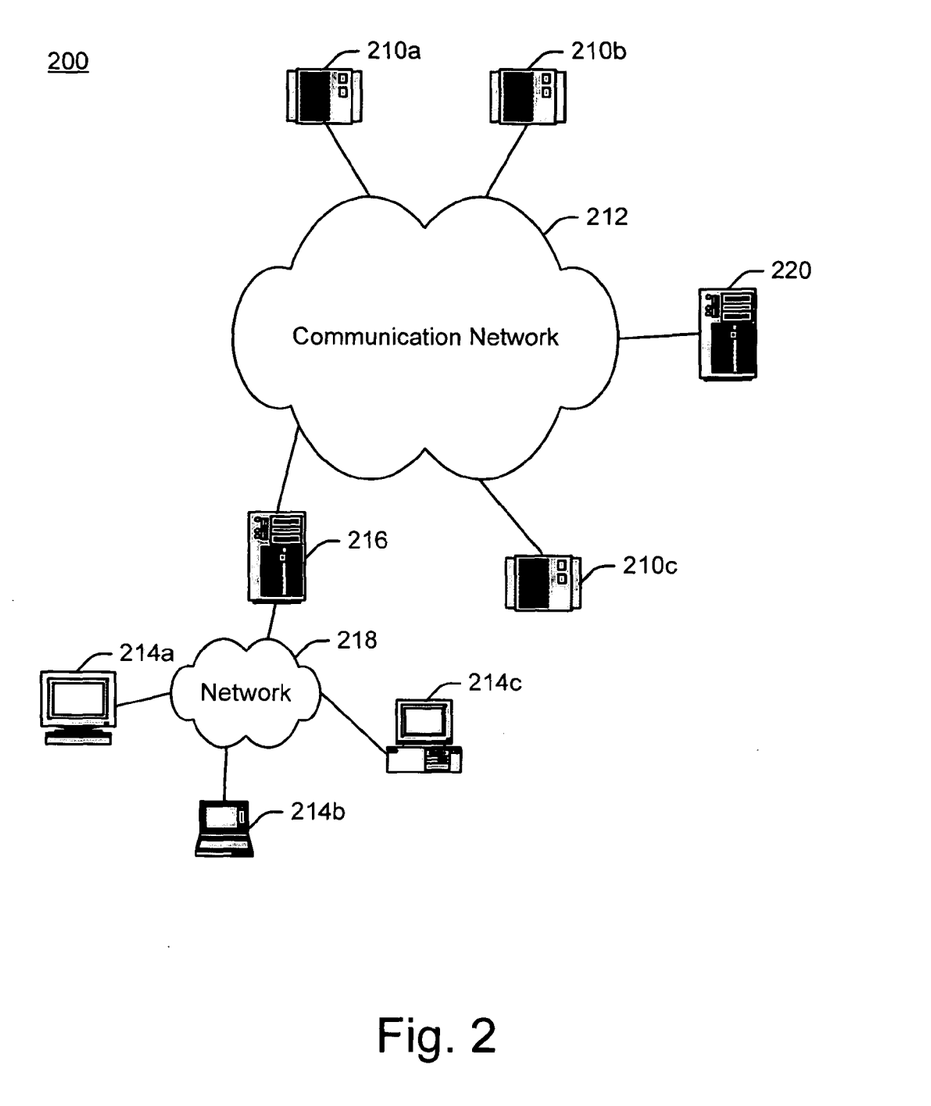
FIG. 2 is a schematic illustration of an exemplary storage network that implements a storage pool in accordance with an exemplary embodiment of the present invention.

FIG. 2 is a schematic illustration of an exemplary storage network 200 that implements a storage pool, such as storage pool 110. Storage network 200 comprises a plurality of storage cells 210a, 210b, 210c connected by a communication network 212. Storage cells 210a, 210b, 210c are implemented as one or more communicatively connected storage devices.

Client computers 214a, 214b, 214c access storage cells 210a, 210b, 210c through a host, such as servers 216, 220. Clients 214a, 214b, 214c are connected to file server 216 directly, or via a network 218 such as a Local Area Network (LAN) or a Wide Area Network (WAN). The number of storage cells 210a, 210b, 210c that can be included in any storage network is limited primarily by the connectivity implemented in the communication network 212. By way of example, a switching fabric comprising a single FC switch can interconnect 256 or more ports, providing a possibility of hundreds of storage cells 210a, 210b, 210c in a single storage network.

Figure 3:
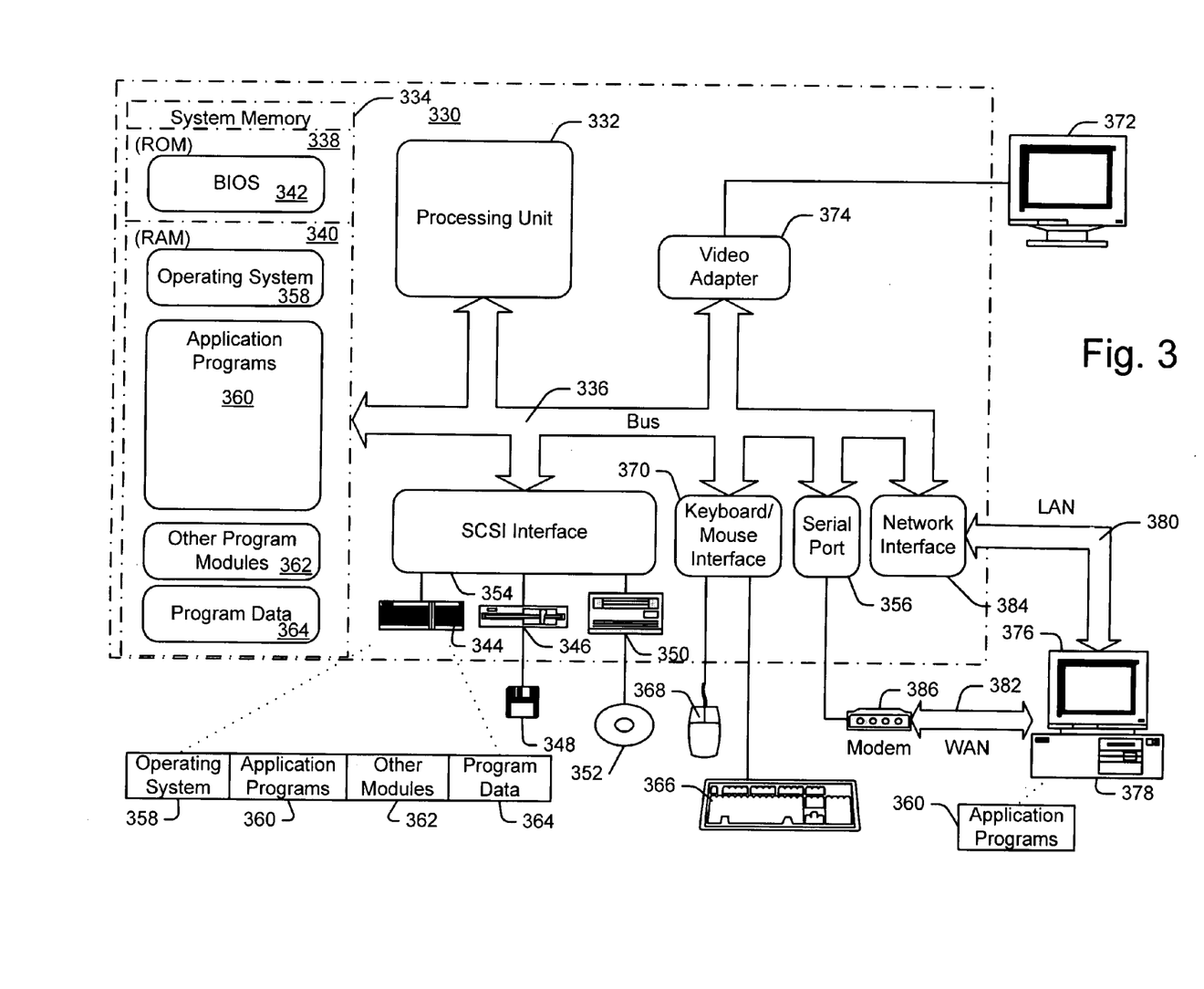
FIG. 3 is a schematic illustration of an exemplary computing device in accordance with an exemplary embodiment of the present invention.

Hosts 216, 220 are typically implemented as server computers. FIG. 3 is a schematic illustration of an exemplary computing device 330 that is utilized to implement a host. Computing device 330 includes one or more processors or processing units 332, a system memory 334, and a bus 336 that couples various system components including the system memory 334 to processors 332. The bus 336 represents one or more of any of several types of bus structures, including a memory bus or memory controller, a peripheral bus, an accelerated graphics port, and a processor or local bus using any of a variety of bus architectures. The system memory 334 includes read only memory (ROM) 338 and random access memory (RAM) 340. A basic input/output system (BIOS) 342, containing the basic routines that help to transfer information between elements within computing device 330, such as during start-up, is stored in ROM 338.

Computing device 330 further includes a hard disk drive 344 for reading from and writing to a hard disk (not shown) and includes one or more of a magnetic disk drive 346 for reading from and writing to a removable magnetic disk 348, an optical disk drive 350 for reading from or writing to a removable optical disk 352 such as a CD ROM, or other optical media. The hard disk drive 344, magnetic disk drive 346, and optical disk drive 350 are connected to the bus 336 by a SCSI interface 354 or some other appropriate interface. The drives and their associated computer-readable media provide nonvolatile storage of computer-readable instructions, data structures, program modules and other data for computing device 330. Although the exemplary environment described herein employs a hard disk, a removable magnetic disk 348 and a removable optical disk 352, other types of computer-readable media such as magnetic cassettes, flash memory cards, digital video disks, random access memories (RAMs), read only memories (ROMs), and the like, can also be used in the exemplary operating environment.

A number of program modules can be stored on the hard disk 344, magnetic disk 348, optical disk 352, ROM 338, or RAM 340, including an operating system 358, one or more application programs 360, other program modules 362, and program data 364. A user enters commands and information into computing device 330 through input devices such as a keyboard 366 and a pointing device 368. Other input devices (not shown) include a microphone, joystick, game pad, satellite dish, scanner, or the like. These and other input devices are connected to the processing unit 332 through an interface 370 that is coupled to the bus 336. A monitor 372 or other type of display device is also connected to the bus 336 via an interface, such as a video adapter 374.

Computing device 330 operates in a networked environment using logical connections to one or more remote computers, such as a remote computer 376. The remote computer 376 can be a personal computer, a server, a router, a network PC, a peer device or other common network node, and typically includes many or all of the elements described above relative to computing device 330, although only a memory storage device 378 has been illustrated in FIG. 3. The logical connections depicted in FIG. 3 include a LAN 380 and a WAN 382.

When used in a LAN networking environment, computing device 330 is connected to the local network 380 through a network interface or adapter 384. When used in a WAN networking environment, computing device 330 typically includes a modem 386 or other means for establishing communications over the wide area network 382, such as the Internet. The modem 386, which may be internal or external, is connected to the bus 336 via a serial port interface 356. In a networked environment, program modules depicted relative to the computing device 330, or portions thereof, may be stored in the remote memory storage device. It will be appreciated that the network connections shown are exemplary and other means of establishing a communications link between the computers may be used.

Hosts 216, 220 include host adapter hardware and software to enable a connection to communication network 212. The connection to communication network 212 is through an optical coupling or more conventional conductive cabling depending on the bandwidth requirements. A host adapter is implemented as a plug-in card on computing device 330. Hosts 216, 220 may implement any number of host adapters to provide as many connections to communication network 212 as the hardware and software support.

Generally, the data processors of computing device 330 are programmed by means of instructions stored at different times in the various computer-readable storage media of the computer. Programs and operating systems can be distributed, for example, on floppy disks, CD-ROMs, or electronically, and are installed or loaded into the secondary memory of a computer. At execution, the programs are loaded at least partially into the computer's primary electronic memory.

In operation, the storage capacity provided by arrays of disk drives is added to the storage pool. When an application requires storage capacity, logic instructions on a host computer establish a LUN from storage capacity available on the arrays of disk drives available in one or more storage sites. It will be appreciated that, because a LUN is a logical unit, not necessarily a physical unit, the physical storage space that constitutes the LUN may be distributed across multiple storage cells. Data for the application is stored on one or more LUNs in the storage network. An application that needs to access the data queries a host computer, which retrieves the data from the LUN and forwards the data to the application.

Further, one or more of the storage cells in the storage network can implement RAID-based storage. RAID (Redundant Array of Independent Disks) storage systems are disk array systems in which part of the physical storage capacity is used to store redundant data. RAID systems are typically characterized as one of six architectures, enumerated under the acronym RAID.

As used herein, the term "snapshot" is copy of one or more LUNs, files, and/or directories as they were at a particular point in time. In one exemplary embodiment, a snapshot shares data with its successor (Source Vdisk) until that data has diverged (i.e. new writes to the Source Vdisk or snapshot). For instance, a snapshot requires allocation of new storage on the backend drives when the data diverges from the Source Vdisk. The term "instant restore" refers to a restore operation in which a source volume is restored to a previous point-in-time using a snapshot, and in which the data is available for access contemporaneously.

Figure 4A:
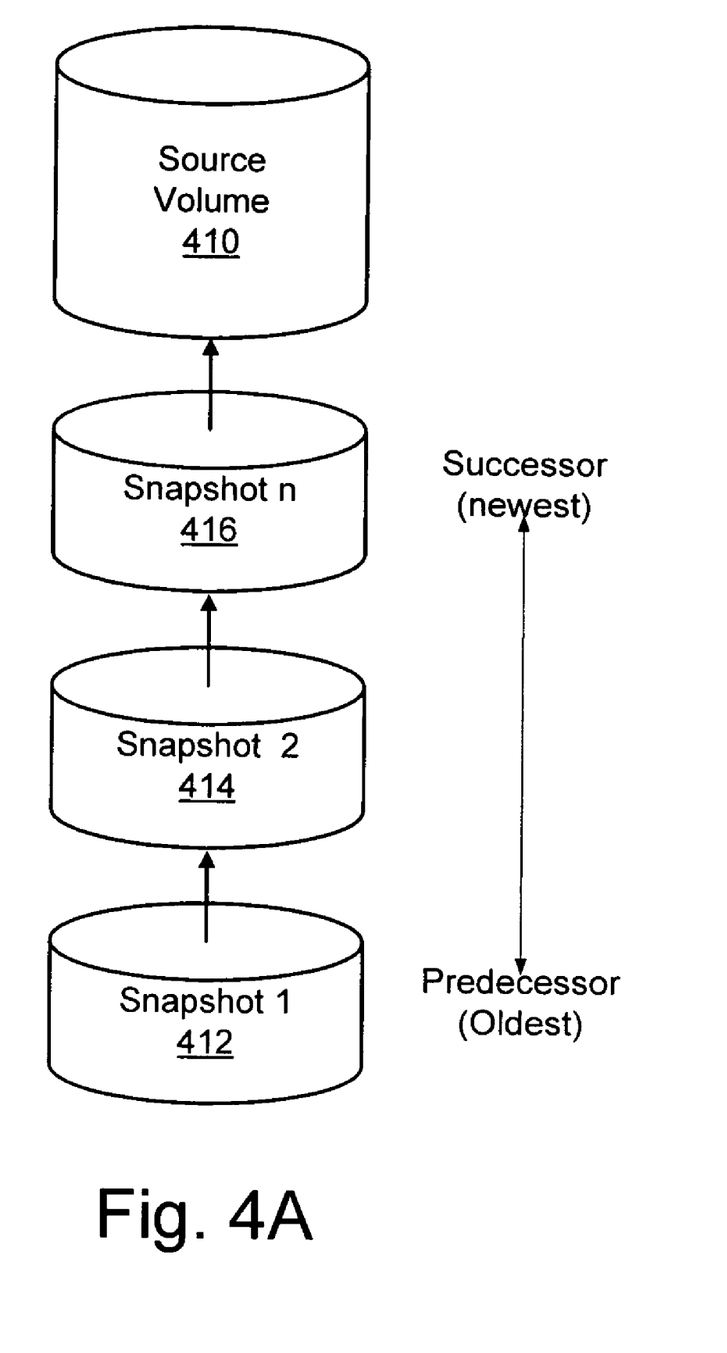
FIG. 4A is a schematic high-level illustration of a data storage architecture in accordance with an exemplary embodiment of the present invention.

FIG. 4A is a schematic high-level illustration of a data storage architecture in accordance with one embodiment. Referring to FIG. 4A, in one embodiment a source volume 410, which may also be referred to as a source virtual disk (Vdisk), is embodied as a logical unit number (LUN) or a logical disk (LD) that includes production data for one or more applications. One or more snapshots 412, 414, 416 include a point-in-time representation of source volume 410.

In one embodiment, snapshots 412, 414, 416 are logically linked, example by pointers in one or more memory structures. In the embodiment depicted in FIG. 4A, snapshot 1 (412) represents a snapshot of the data taken at a first point in time; and snapshot 2 (414) represents a snapshot taken at a second point in time, later than the first point in time. Snapshots are linked in a serial fashion. Hence, snapshot n (416) represents the most recent point in time copy of source volume 410.

In one embodiment, referred to herein as a "space inefficient" snapshot, one or more of snapshots 412, 414, 416 reserve the space on one or more physical drives necessary to hold a copy of the data in source volume 410. In an alternate embodiment, referred to herein as a "space efficient" snapshot, one or more of snapshots 412, 414, 416 does not reserve space on one or more physical drives to hold a copy of the data in source volume 710. Rather, physical storage space for the snapshot 412, 414, 416 is allocated on demand as the data is written into the snapshot. A space efficient snapshot consumes less storage space than a space-inefficient snapshot, but creates a possibility of reaching an overcommit state, in which the physical storage lacks sufficient storage capacity to hold the snapshot.

After the split, if the snaptree will be used for archiving or such that it does not expect many new writes, one exemplary embodiment reclaims reserved capacity by changing the snapshots from space inefficient to space efficient. For instance, maybe the snapshots were space inefficient when first created off the Source Vdisk to ensure that they would not overcommit. Now when they are split off, they are more static and will not change much (if at all). It may be beneficial for the user to reclaims this reserved space.

Figure 4B:
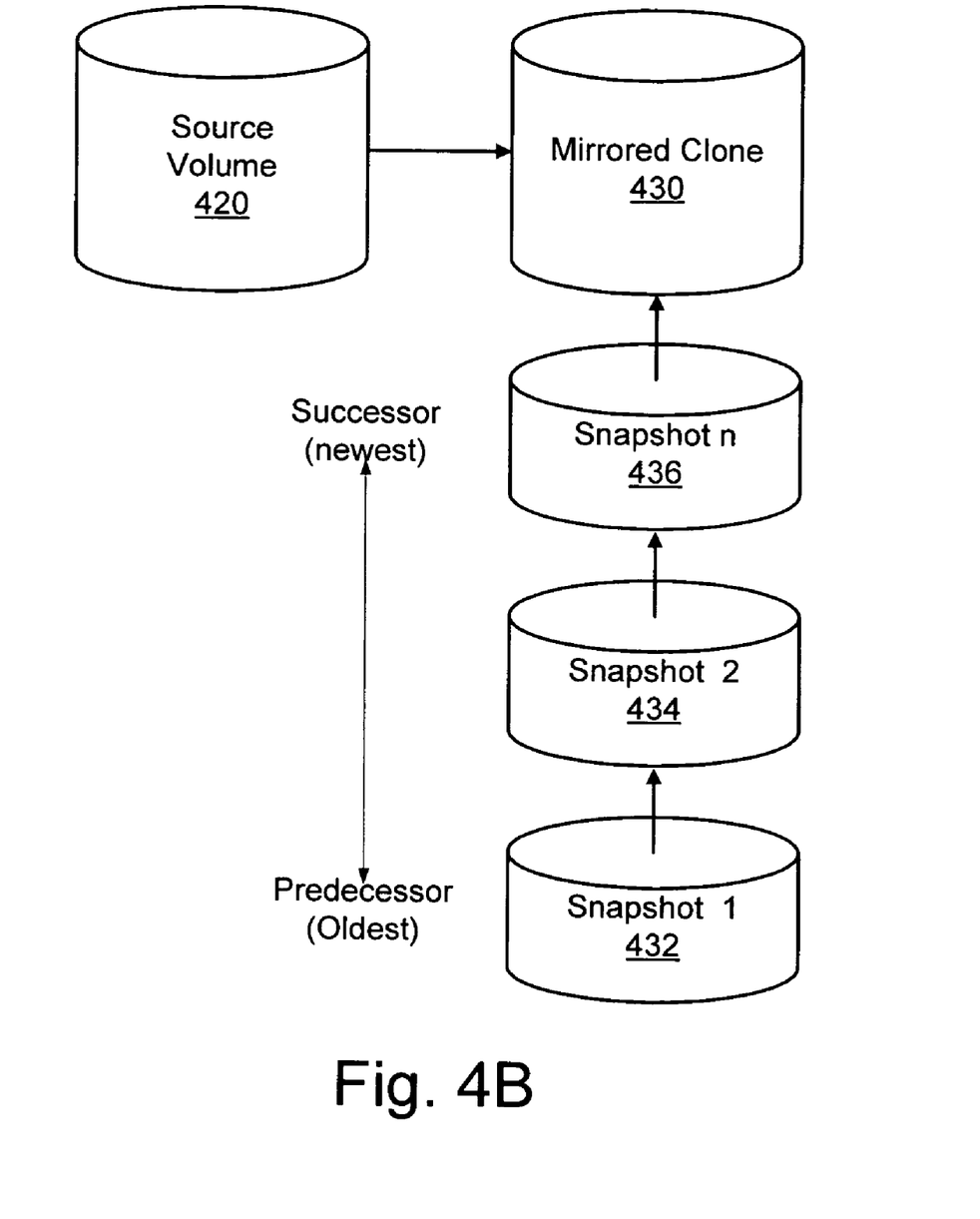
FIG. 4B is a schematic high-level illustration of a data storage architecture in accordance with another exemplary embodiment of the present invention.

FIG. 4B is a schematic high-level illustration of a data storage architecture in accordance with another embodiment. Referring to FIG. 4B, in one embodiment a source volume 420 has a mirrored clone 430 that includes a complete copy of the data in source volume 420 or a point in time complete copy of the data in source volume 420. One or more snapshots 432, 434, 436 are taken of mirrored clone 430. In one embodiment, mirror clone 430 resides in a different logical disk allocation domain (LDAD) from the source volume 420. This configuration permits the mirror clone data to reside on a different set of disks from the source volume, which provides performance and fault tolerance benefits. To ensure that writes to the newly split tree do not cause it to go overcommit, one exemplary embodiment uses a read/write (R/W) mode that sets the write cache of the new tree to "write through" and has the EVA fail any new writes that would cause the tree to go overcommit.

Figure 5A:
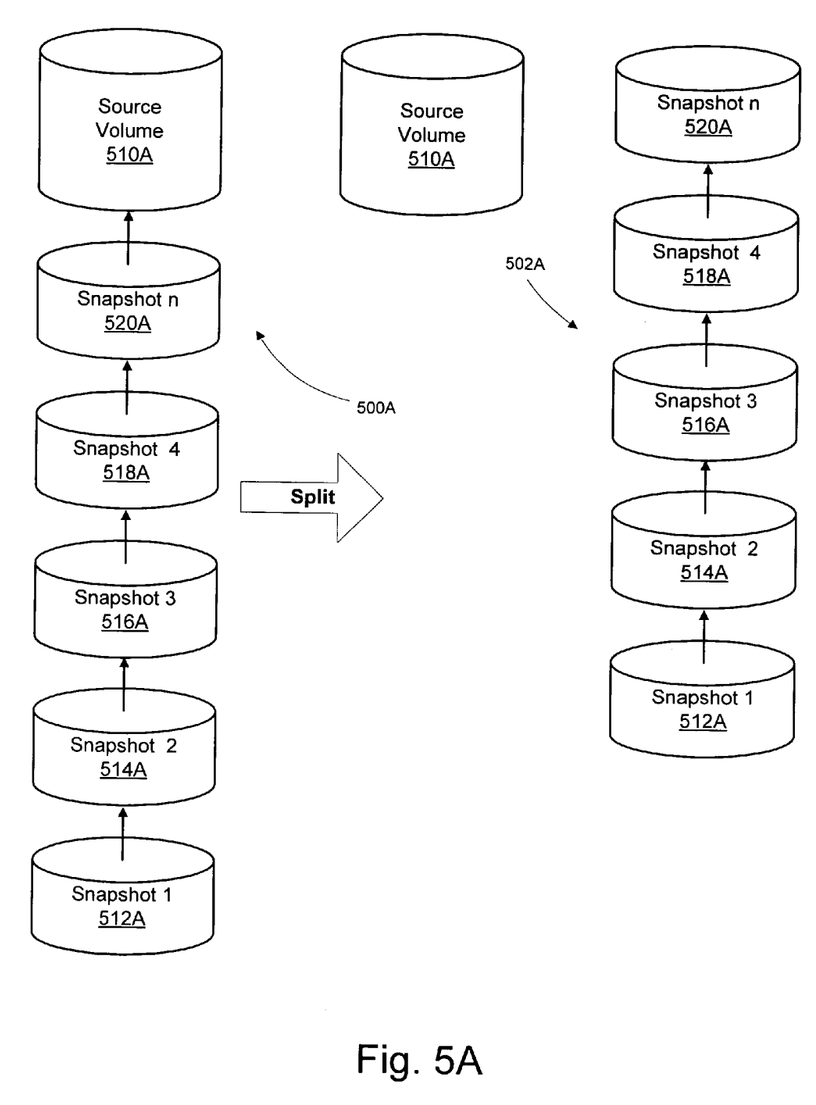
FIG. 5A is a schematic illustration of a logical disk being split in accordance with an exemplary embodiment of the present invention.
Figure 5B:
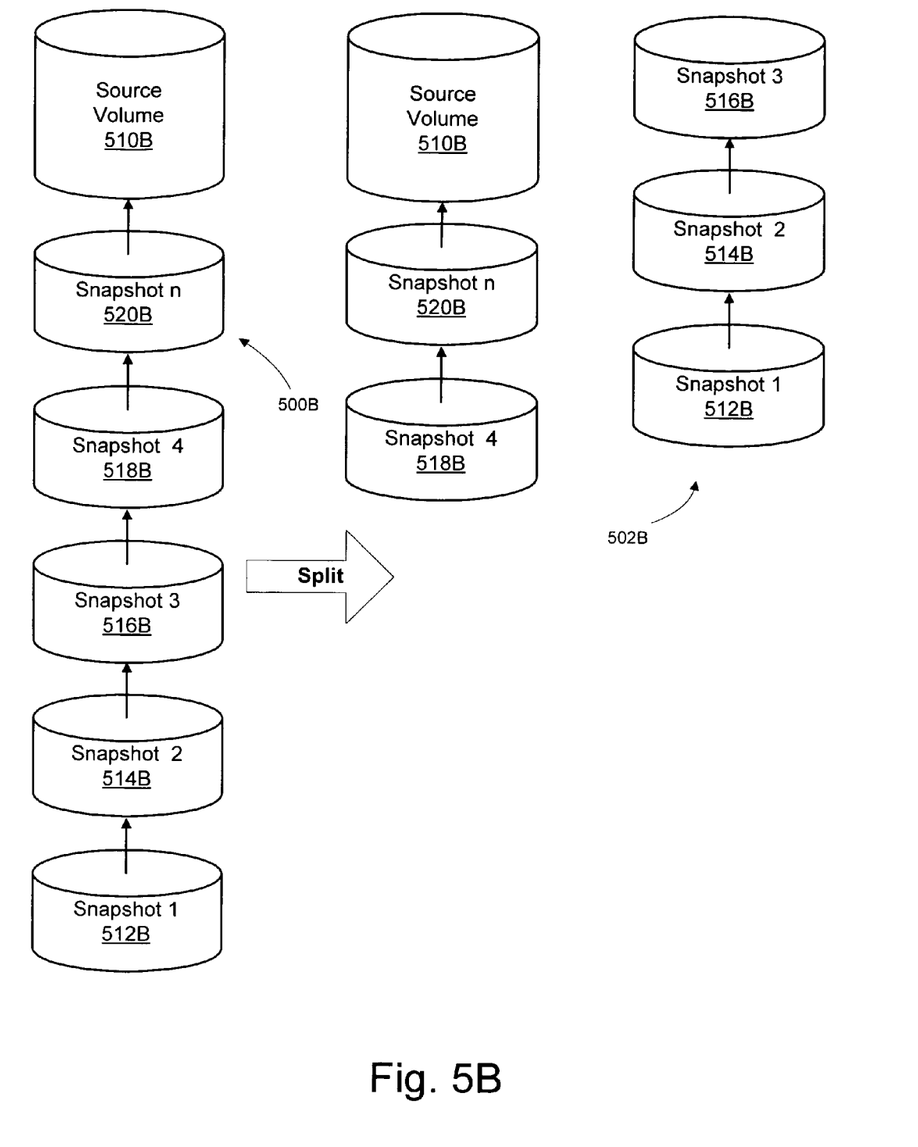
FIG. 5B is a schematic illustration of a logical disk being split in accordance with another exemplary embodiment of the present invention.

Aspects of managing snapshots are further illustrated in connection with FIGS. 5A and 5B. Specifically, FIGS. 5A and 5B are schematic illustrations of a logical disk or source volume being split in accordance with an exemplary embodiment of the present invention.

Exemplary embodiments enable users to create unlimited number of snapshots under a Logical Disk by spinning off, separating, or dividing snapshots as necessary. The old snapshots are maintained and stored as a separate, independent, standalone tree, which is not be affected if overcommit occurs in the original Logical Disk or tree. FIG. 5A illustrates a snapshot tree 500A being split at two different points. By way of example, if the split point is at snapshot Sn (i.e., snapshot 520A), then after the split the original source volume 510A (example, logical disk) and a new snapshot tree 502A exist. The source volume 510A has no snapshots, while the new tree 502A has a plurality of snapshots previously associated with the source volume 510A (snapshots being showns as 512A-520A). A top snapshot 520A (previously associated with source volume 510A) now forms the top of tree 502A. Thus, snaptree preserves the point-in-time of copies of all snapshots.

Embodiments in accordance with the present invention are not limited to any particular number of splits. Thus, tree 502A can be further split one, two, three, etc. more times depending on the number, n, of snapshots. In one embodiment, the tree is split so each snapshot previously associated with the Logical Disk results in a separate and independent standalone tree. In another embodiment, the tree is split so the new tree is a standalone tree, but metadata is kept that still associates 520A with 510A for the purpose of a future restore, but not for sharing data.

Embodiments in accordance with the present invention are also not limited to any particular location for forming a split. By way of example, FIG. 5B shows a snapshot tree 500B that is split to result in two different independent trees. If the split occurs along snapshot 516B, then the source volume 510B has two snapshots 520B and 518B, while the newly formed tree 502B has three snapshots (516B, 514B, and 512B). Thus, two new independent and separate trees are formed. After the split, the Logical Disk or source volume 510B can receive additional snapshots. Also Snapshot 516B, now a top level LD can also receive additional snapshots.

Exemplary embodiments enable users to create new RAID type of snapshots by splitting all existing snapshots off the original Logical Disk while keeping all the existing snapshots in a standalone tree. Such embodiments also enable creation of mirror clones or snapclones for the Logical Disk after the splitting.

In one exemplary embodiment, managing the snapshot splitting is implemented in snapshot/snapclone code (example, enterprise virtual array (EVA) firmware). For example, a snapclone unshare process is utilized to unshare a chosen snapshot, which will turn the snapshot into a clone with all predecessor snapshots still under it. The use of sharing bits and architecture in place in the firmware allows the implementation of this solution to be simple and efficient. By way of example, one algorithm to perform the unsharing or split is as follows:

```
For a given snapshot Si for splitting, do
    For each Rseg
        if Si shares data with it succecessor Si+1
        Copy data from the Si+1 to Si
        Set Si+1 share with predecessor bit = 0
        Set Si share with successor bit = 0
    Delink Si from Si+1 by update metadata.
```

Once the tree is split, Si uses more space if it was a space efficient snapshot before the splitting because the shared data between Si and Si+1 now have another copy residing in Si. This embodiment is good for data redundancy but has potential to get into overcommit during the splitting. However, such overcommit is handled by just stopping the split or by adding some checks to forecast the capacity needed for splitting. User can also avoid overcommit by making sure there is enough space before initiating a request for the splitting.

After the splitting, in the new snapshot tree, all snapshots except the top node are intact—a snapshot is still the same type (space efficient, or inefficient) and uses the same amount of space. Further, after the split, the standalone tree is no longer associated with the original Logical Disk or remaining snapshots to the Logical Disk.

In one exemplary embodiment, after the splitting, the new snapshot tree is put back to where it was before or attached to a mirrorclone/snapclone of the same original Logical Disk in a different LDAD. One embodiment performs splitting of the tree without copy shared data from Si+1 to Si and just enables the new tree to remember where it was split-off so that the data can be found later.

As used herein, the term "disk array" means a linked group of one or more independent disk drives. By way of example, the disk arrays include daisy chain configuration or RAID technology and organize data storage into logical units (LUNs) that appear as linear blocks to clients.

In one exemplary embodiment, embodiments are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision. For instance, splitting of the logical disk occurs automatically. In another embodiment, splitting occurs based on or in response to user commands.

The methods in accordance with exemplary embodiments of the present invention are provided as examples and should not be construed to limit other embodiments within the scope of the invention. For instance, discussion of methods should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as firmware (example firmware on a controller board) and/or as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   logically linking a plurality of snapshots to a logical disk in a storage network; and
   splitting the snapshots from the logical disk to form a snapshot tree that includes the snapshots split from the logical disk.

2. The method of claim 1 further comprising, splitting the snapshot tree into plural subtrees, each subtree having at least one snapshot previously associated with the logical disk.

3. The method of claim 1 further comprising, maintaining a point-in-time copy of data for the snapshots after splitting the snapshots from the logical disk.

4. The method of claim 1 further comprising:
   assigning a first redundant array of inexpensive disks (RAID) level type to the logical disk;
   assigning a second RAID level, different than the first RAID level, to the snapshot tree.

5. The method of claim 1 further comprising:
   storing the snapshot tree;
   adding new snapshots to the logical disk after the snapshot tree is formed.

6. The method of claim 1 further comprising, splitting the snapshots from the logical disk without deleting any of the snapshots.

7. The method of claim 1 further comprising, creating a mirror clone of the logical disk with the snapshots without deleting any of the snapshots.

8. A computer readable medium having instructions for causing a computer to execute a method, comprising:
   linking plural snapshots to a logical disk in a storage network, each snapshot including a copy of data at a different point in time; and
   splitting at least one snapshot from the logical disk to form a snapshot tree without deleting any of the plural snapshots.

9. The computer readable medium of claim 8 further comprising:
   creating redundant array of inexpensive disks (RAID) level 0 for the plural snapshots linked to the logical disk;
   creating RAID level 5 for the snapshot tree.

10. The computer readable medium of claim 8 further comprising, creating a mirror clone of the logical disk without deleting any of the plural snapshots.

11. The computer readable medium of claim 8 further comprising, storing the snapshot tree as a standalone tree that is not logically linked to the logical disk.

12. The computer readable medium of claim 8 further comprising, preserving point-in-time copies of all snapshots after splitting of the at least one snapshot from the logical disk.

13. The computer readable medium of claim 8 further comprising, splitting at least a second snapshot from the logical disk to form a second snapshot tree without deleting any of the plural snapshots.

14. The computer readable medium of claim 8 further comprising, serially linking the plural snapshots together.

15. The computer readable medium of claim 8 further comprising, avoiding an overcommit by verifying enough memory space exists before initiating splitting of the at least one snapshot from the logical disk.

16. A storage device system, comprising:
   a memory for storing logic instructions; and
   a processor for executing the logic instructions to:
      link plural snapshots to a logical disk in a storage network, each snapshot including a copy of data at a different point in time; and
      split snapshots from the logical disk to result in (1) the logical disk with no snapshots and (2) a snapshot tree with the plural snapshots.

17. The computer system of claim 16, wherein the processor further executes the logic instructions to split the snapshot tree into plural snapshot trees, each snapshot tree having at least one snapshot previously linked to the logical disk.

18. The computer system of claim 16, wherein the processor further executes the logic instructions to split the snapshots from the logical disk without deleting any of the snapshots.

19. The computer system of claim 16, wherein the processor further executes the logic instructions to add new snapshots to the logical disk after the snapshots are split from the logical disk.

20. The computer system of claim 16, wherein the processor further executes the logic instructions to assign different redundant array of inexpensive disk (RAID) levels to each of the (1) the logical disk with no snapshots and (2) the snapshot tree with the plural snapshots.

* * * * *